United States Patent
Yaqoob et al.

(10) Patent No.: US 10,451,402 B2
(45) Date of Patent: Oct. 22, 2019

(54) SINGLE SHOT FULL-FIELD REFLECTION PHASE MICROSCOPY

(75) Inventors: Zahid Yaqoob, Cambridge, MA (US); Wonshik Choi, Seoul (KP); Toyohiko Yamauchi, Hamamatsu (JP); Michael Feld; David Feld, legal representative, Newark, CA (US); Alison Hearn, legal representative, Jamaica Plain, MA (US); Jonathan Feld, legal representative, Somerville, MA (US)

(73) Assignees: Massachusetts Institute of Technology, Cambridge, MA (US); Hamamatsu Photonics K.K., Hamamatsu (JP)

( * ) Notice: Subject to any disclaimer, the term of this patent is extended or adjusted under 35 U.S.C. 154(b) by 378 days.

(21) Appl. No.: 13/358,254

(22) Filed: Jan. 25, 2012

(65) Prior Publication Data
US 2012/0307035 A1    Dec. 6, 2012

Related U.S. Application Data (60) Provisional application No. 61/436,026, filed on Jan. 25, 2011.

(51) Int. Cl.
G01B 9/04       (2006.01)
G01N 21/45      (2006.01)
(Continued)

(52) U.S. Cl.
CPC ............ *G01B 9/04* (2013.01); *G01B 9/0207* (2013.01); *G01B 9/02032* (2013.01);
(Continued)

(58) Field of Classification Search
CPC ..................... G02B 21/365; G02B 21/367
(Continued)

(56) References Cited

U.S. PATENT DOCUMENTS 4,596,145 A    6/1986   Smith et al.
4,694,434 A    9/1987   von Ramm et al.
(Continued)

FOREIGN PATENT DOCUMENTS

CN    1156101 C    6/2004
CN    1517672 A    8/2004
(Continued)

OTHER PUBLICATIONS

Massatsch et al., "Time-domain optical coherence tomography with digital holography microscopy", Optical Society of America, 2005.*
(Continued)

*Primary Examiner* — Chikaodili E Anyikire
(74) *Attorney, Agent, or Firm* — McCarter & English, LLP (57) ABSTRACT

The present invention relates to a full-field reflection phase microscope. In a preferred embodiment, the invention can combine low-coherence interferometry and off-axis digital holographic microscopy (DHM). The reflection-based DHM provides highly sensitive and a single-shot imaging of cellular dynamics while the use of low coherence source provides a depth-selective measurement. A preferred embodiment of the system uses a diffraction grating in the reference arm to generate an interference image of uniform contrast over the entire field-of-view albeit low-coherence light source. With improved path-length sensitivity, the present invention is suitable for full-field measurement of membrane dynamics in live cells with sub-nanometer-scale sensitivity.

60 Claims, 10 Drawing Sheets

(51) Int. Cl.
*G01B 9/02* (2006.01)
*G02B 27/10* (2006.01)
*G02B 27/50* (2006.01)
*G03H 1/04* (2006.01)
G03H 1/00 (2006.01)

(52) U.S. Cl.
CPC ..... *G01B 9/02047* (2013.01); *G01B 9/02064* (2013.01); *G01B 9/02084* (2013.01); *G01B 9/02091* (2013.01); *G01N 21/45* (2013.01); *G02B 27/1086* (2013.01); *G02B 27/50* (2013.01); *G03H 1/0443* (2013.01); *G03H 2001/005* (2013.01); *G03H 2001/0456* (2013.01); *G03H 2001/0467* (2013.01); *G03H 2222/24* (2013.01)

(58) Field of Classification Search
USPC .......................................................... 348/79
See application file for complete search history.

(56) References Cited

U.S. PATENT DOCUMENTS

| | | | |
|---|---|---|---|
| 5,194,918 | A | 3/1993 | Kino et al. |
| 5,747,810 | A | 5/1998 | Schotland |
| 6,021,223 | A | 2/2000 | Toyoda et al. |
| 6,456,380 | B1 | 9/2002 | Naganuma |
| 6,549,801 | B1 | 4/2003 | Chen et al. |
| 6,611,339 | B1 | 8/2003 | Yang et al. |
| 6,665,456 | B2 | 12/2003 | Dave et al. |
| 6,868,347 | B2 | 3/2005 | Li et al. |
| 8,886,295 | B2 | 11/2014 | Nolte et al. |
| 2002/0097402 | A1 | 7/2002 | Manning |
| 2002/0154589 | A1* | 10/2002 | Tanaka ...................... G03H 1/16 369/103 |
| 2003/0081220 | A1* | 5/2003 | Ostrovsky .......... G01N 21/4795 356/479 |
| 2005/0057756 | A1* | 3/2005 | Fang-Yen .............. G01N 21/45 356/497 |
| 2005/0078342 | A1 | 4/2005 | Tsukagoshi et al. |
| 2006/0058682 | A1* | 3/2006 | Miller .................... A61B 3/102 600/476 |
| 2006/0192969 | A1 | 8/2006 | Marks et al. |
| 2006/0291712 | A1 | 12/2006 | Popescu et al. |
| 2007/0110334 | A1 | 5/2007 | Takahashi et al. |
| 2009/0125242 | A1* | 5/2009 | Choi ...................... G01N 21/45 702/19 |
| 2009/0294628 | A1 | 12/2009 | Aoki |
| 2011/0134436 | A1* | 6/2011 | Podoleanu ........... A61B 3/1015 356/512 |
| 2011/0235045 | A1* | 9/2011 | Koerner ............. G02B 21/0056 356/451 |

FOREIGN PATENT DOCUMENTS

| | | |
|---|---|---|
| CN | 1623085 A | 6/2005 |
| CN | 1758015 A | 4/2006 |
| CN | 101111739 A | 1/2008 |
| CN | 101147052 A | 3/2008 |
| EP | 2357539 A1 | 8/2011 |
| JP | 07318806 | 12/1995 |
| JP | H10-186283 A | 7/1998 |
| JP | 10-332329 A | 12/1998 |
| JP | 2002-526815 A | 8/2002 |
| JP | 2005-070675 A | 3/2005 |
| JP | 2006-064610 A | 3/2006 |
| JP | 2006-250849 A | 9/2006 |
| JP | 2007-139543 A | 6/2007 |
| JP | 2008-534929 A | 8/2008 |
| JP | 2009-281992 A | 12/2009 |
| JP | 2010-14444 A | 1/2010 |
| WO | 2000/20929 A1 | 4/2000 |
| WO | 2006/104899 A2 | 10/2006 |
| WO | 2009/111609 A2 | 9/2009 |
| WO | 2011/160068 A1 | 12/2011 |

OTHER PUBLICATIONS

Arnison et al., Using the Hilbert Transform for 3D Visualization of Differential Interface Contrast Microscope Images. Journal of Microscopy. Jul. 2000;199(Pt. 1):79-84.
Belvaux et al., Visualization of Phase Objects by Hilbert Transformation. Nouvelle Revue d'Optique Appliquée, France. 1971;2(3):149-162.
Choi et al., Full-Field and Single-Shot Quantitative Phase Microscopy Using Dynamic Speckle Illumination. Optics Letters. Jul. 2011;36(13):2465-2467.
Ikeda et al., Hilbert Phase Microscopy of Investigating Fast Dynamics in Transparent Systems. Optics Letters. 2005;30(10):1165-1167.
Kniffen et al., Bispectral Magnitude and Phase Recovery Using a Wide Bandwidth Acousto-Optic Processor. Applied Optics. Mar. 1992;31(8):1015-1029.
Lowenthal et al., Observation of Phase Objects by Optically Processed Hilbert Transform. Applied Physics Letters. 1967;11(2):49-51.
Massatsch, et al., Time-Domain Optical Coherence Tomography with Digital Holographic Microscopy. Applied Optics.Apr. 2005;44(10):1806-1812.
Popescu et al., Erythrocyte structure and dynamics quantified by Hilbert phase microscopy. J Biomed Opt. Nov.-Dec. 2005;10(6):060503. 3 pages.
Popescu et al., Imaging red blood cell dynamics by quantitative phase microscopy. Blood Cells Mol Dis. Jul.-Aug. 2008;41(1):10-6.
Watanabe et al., Time-Gated Full-Field Optical Coherence Tomography Using Optical Hilbert Transformation. The Second Asian and Pacific Rim Symposium on Biophotonics, pp. 10-11, Dec. 2004.
Yamauchi, et al., Low-coherent quantitative phase microscope for nanometer-scale measurement of living cells morphology. Opt Express. Aug. 4, 2008;16(16):12227-38.
International Preliminary Report on Patentability for Application No. PCT/US2012/022573, dated Aug. 8, 2013. 11 pages.
International Search Report for Application No. PCT/US2012/022573, dated May 4, 2012. 4 pages.
Dubois et al., Digital holographic microscopy for the three-dimensional dynamic analysis of in vitro cancer cell migration. J Biomed Opt. Sep.-Oct. 2006;11(5):054032. 5 pages.
Dubois et al., Partial spatial coherence effects in digital holographic microscopy with a laser source. Appl Opt. Feb. 10, 2004;43(5):1131-9.
Iwai et al., Quantitative phase imaging using actively stabilized phase-shifting low-coherence interferometry. Opt Lett. Oct. 15, 2004;29(20):2399-401.
Li et al., Full-field quantitative phase imaging by white-light interferometry with active phase stabilization and its application to biological samples. Opt Lett. Jun. 15, 2006;31(12):1830-2.
Yaqoob et al., Improved phase sensitivity in spectral domain phase microscopy using line-field illumination and self phase-referencing. Opt Express. Jun. 22, 2009;17(13):10681-7.

* cited by examiner

Phase image of the bead surface

SINGLE SHOT FULL-FIELD REFLECTION PHASE MICROSCOPY

CROSS REFERENCE TO RELATED APPLICATION

This application claims the priority to U.S. Application No. 61/436,026, filed Jan. 25, 2011. The entire contents of the above application being incorporated herein by reference.

STATEMENT REGARDING FEDERALLY SPONSORED RESEARCH OR DEVELOPMENT

This work was funded by the National Center for Research Resources of the National Institutes of Health (P41-RR02594-18), the National Science Foundation (DBI-0754339).

BACKGROUND OF THE INVENTION

Bio-microrheology is the quantitative study of mechanical properties of live cells. Variations in mechanical properties are intrinsic indicators of ongoing cellular processes such as increase in elasticity of certain cancer cells, change of membrane stiffness in malaria-infected red blood cells, and changes in cellular adhesion, for example. The measurement of rheological properties of cell membranes is advantageous since it may also indirectly provide information on the internal structures of cell. A number of different techniques exist to assess membrane rheological properties of live cells. These include atomic force microscopy (AFM), optical and magnetic tweezers, pipette aspiration, electric field deformation, and full-field transmission phase microscopy. Many of these methods use large deformations that can lead to a non-linear response. For point-measurement techniques such as AFM, the time scales to probe large surface areas of a cell membrane are in minutes, preventing the study of high-speed cell membrane dynamics over a wider surface area. Transmission phase microscopy has been successfully utilized to measure membrane rheological properties of red blood cells that have 2-D bilayer cytoskeleton. However, most types of cells have complicated 3-D internal cellular structures, rendering most of the above techniques unsuitable as they probe a combination of membrane as well as bulk properties of cells that are difficult to decouple.

Thus further improvements are needed in the field of phase microscopy for measuring complex biological systems as well as other applications in scientific and industrial metrology.

SUMMARY OF THE INVENTION

The present invention relates to full-field reflection-based phase microscopy. Preferred embodiments of systems and methods of the present invention involve the measurement of structures having small features, such as the plasma and/or nuclear membrane dynamics, in general cell types. Due to the 3-D cytoskeleton, these cells are much stiffer than red blood cells, for example, indicating that corresponding membrane fluctuations are much smaller than can be detected with transmission phase microscopy. In this respect, reflection-based optical methods can provide a $2n/\Delta n$ advantage in measurement sensitivity over the transmission-based optical techniques. Preferred systems and methods utilize a portion of light from a light source to interfere with light that is also used to illuminate the material to be measured. A selected diffraction order of the light from the light source is coupled to a two dimensional detector array along with an image of a selected field of view, or image field, of the material. This provides a full field interferogram of the material.

Low-coherence interferometry is used to sample the reflection signal within a material at a selected depth of interest. In the past, both spectral domain as well as time domain optical coherence tomography (OCT) based implementations of reflection phase microscopy have had limitations that limit their usefulness. Previously, a quantitative phase microscope based on spectral domain OCT and line-field illumination have been used, for example. The line-field reflection phase microscope used low-coherent illumination and confocal gating to successfully obtain the surface profile of a cell membrane with sub-nanometer axial resolution. Using the line-field approach, a 1 kHz frame rate with more than hundred data points along the line illumination was demonstrated. The first full-field phase sensitive OCT was reported using swept-source OCT configuration, which required 1024 wavelength encoded images to make a volume image. However, the acquisition rate (25 ms integration time per wavelength) was not sufficient to observe cellular dynamics.

Prior attempts using a time-domain reflection phase microscope based on phase shifting interferometry limited time resolution (1.25 sec) due to the need for taking multiple images. There was an attempt to use off-axis digital holography with a low-coherence source to take a full-field phase image in a single shot, but the tilting of the reference mirror caused uneven interference contrast and thereby impeded full-field imaging.

Thus, the present invention provides the first single-shot full-field reflection phase microscope based on a low-coherence light source and off-axis interferometry. The low coherence source can be a pulsed laser, a superluminescent diode or a temporally and/or spatially low coherent source, such as a metal halide lamp (incoherent). The system provides the wavefront tilt in the reference beam such that it interferes with the sample beam across the whole field-of-view (or imaging field). The single-shot interferograms are processed to determine the optical phase of the beam reflected back from the sample being measured, providing a surface profile without the need for raster or 1-D scanning. Since single-shot interferograms are required to retrieve sample phase, the amount of light returning from the cell and camera frame rate define the speed of the surface imaging. Thus, the present invention provides 1 kHz full-field imaging to observe the membrane motion related to the thermal fluctuations in HeLa cells, for example.

A preferred embodiment of the invention provides a quantitative reflection phase microscope based on en-face optical coherence tomography and off-axis digital holography. The system can utilize a diffraction grating in the reference arm to provide the desired angular tilt to the reference beam for off-axis interferometry. The full-field illumination allows single-shot phase measurement of multiple points on the surface of interest and enables the use of a self phase-referencing method to reject common-mode noise occurring in interferometric systems using a separate reference arm. In this full-field reflection phase microscope, the self-phase referencing suppressed phase noise down to as low as 21(pm/$\sqrt{HZ}$). With such high phase sensitivity, the system can resolve thermal motion of the cell surface in the field of view, which can be on the order of 100 picometers to 150 nanometers, for example. An application of the full-field reflection phase microscope is to use plasma or membrane fluctuations to estimate the mechanical properties of cell membranes or the bulk visco-elastic properties of the cell cytoskeleton or nucleoskeleton. These variations in cell's mechanical properties can serve as non-invasive biomarker to measure the pathophysiology of general cell types. The system can also provide full-field and multi-cell imaging of cellular electromotility, including cell membrane motion driven by the action potential in single mammalian cells.

Preferred embodiments of the invention can be used for applications relating to industrial metrology, such as the fabrication of small devices, such as integrated circuits.

DESCRIPTION OF THE DRAWINGS

FIGS. 1A-1B include a schematic of full-field single-shot reflection phase microscope using a grating, spatial filter, and Ti:sapphire light source where SMF: single mode fiber, Li: $i^{th}$ spherical lens, BSi: $i^{th}$ beam splitter, G: diffraction grating, Si: $i^{th}$ spatial filter; and where FIG. 1B shows an interferogram with a flat surface as the sample.

FIGS. 2A-2E include a surface profile of a 40 micron diameter polystyrene microsphere measured using the single-shot full-field reflection phase microscope.

FIGS. 5A-5B show the system and results of the cell membrane fluctuation measurement; where

DETAILED DESCRIPTION OF THE INVENTION

Figures 1A, 1B:
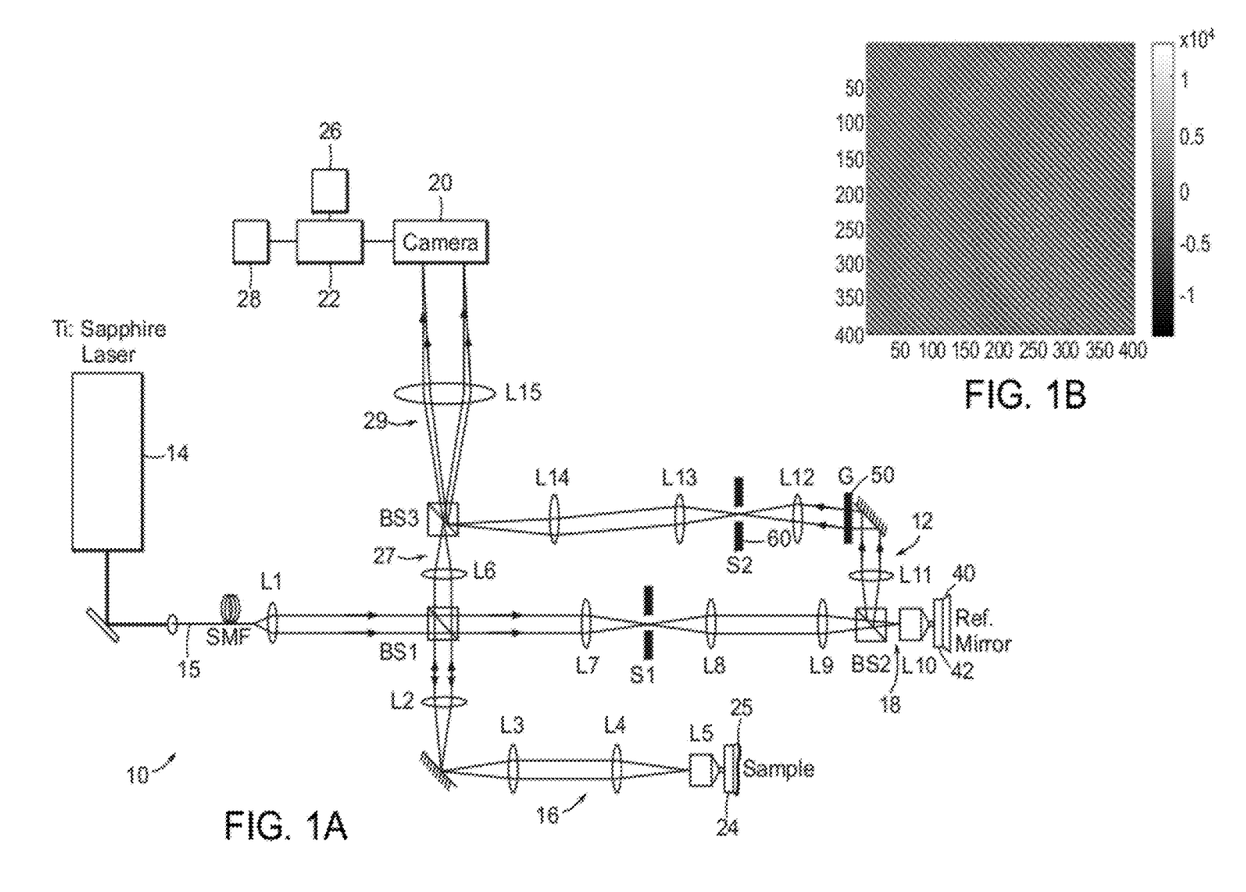

FIG. 1A shows the schematic of a preferred embodiment of the invention providing single-shot full-field reflection phase microscope (FF-RPM). Light from a mode-locked Ti:Sapphire laser (center wavelength, $\lambda_c$=800 nm) is coupled into a single-mode fiber 15 for delivery as well as for spectrum broadening. The full-width-half-maximum spectral width, $\Delta\lambda$ at the fiber output measures 50 nm, which yields a round trip coherence length of 4 μm in a typical culture medium with refractive index, n, equal to 1.33. The sample beam that travels along the first beam path 16 through lenses L2, L3, L4, and a water immersion 60× objective lens L5 (NA=1.2), reflects off the sample surface 24 and makes an image of the sample on a high-speed complementary metal oxide semiconductor (CMOS) camera via lenses L6 and L15. The camera can be a pixelated imaging detector 20 that is connected to a data processor or computer 22 which can process images, provide the images to a display 26 or to a memory 28 for further processing and storage of the images. The computer can be connected to translation stages 25 and 40 that can control the position of the sample and the reference mirror in three orthogonal directions as well as the angular orientation relative to direction of incident light from the light source. The reference beam, which passes through lenses L7, L8, L9 and L10 on a second optical path 18, is diverted on its way back using a beam splitter BS2 onto a third beam path 12. Portion of the reference beam that goes back through BS2 is blocked using a spatial filter S1. On the other hand, the deflected beam passes through lenses L11-L14 and combines with the returning sample beam on a fourth beam path 27 at the $3^{rd}$ beam splitter BS3. For off-axis interferometry, a diffraction grating G (50) is introduced in one of the conjugate planes. Out of multiple diffracted orders, only the +$1^{st}$ order can be selected by placing a spatial filter S2 (60) in the Fourier plane of lens L12. As a result, the diffracted reference beam interferes with the sample beam along path 29 in the image plane at an angle. Note that the period of the diffraction grating and the magnification between the grating and the camera provide the desired angular shift to the reference beam for off-axis interferometry. Moreover, this approach provides equal path length across the whole reference beam wavefront, unlike prior systems that simply used reference mirror tilt for off-axis interferometry.

In other words, since the grating and the camera suffice the imaging condition, the optical path length measured from any point on the grating to the corresponding pixel on the camera is constant. As a result, this condition provides homogeneous fringe visibility across the whole field-of-view. Note that the system is capable of taking quantitative phase images in double-pass transmission mode as well as reflection mode, which is achieved by placing the coherence gate (see 400 in FIG. 4A) on the glass slide or the cell membrane, respectively.

FIG. 1B shows a measured interferogram with a flat surface as the sample. The spatial fringes are straight as well as equally spaced when the sample is flat. The total measured intensity at the CMOS camera can be written as $$I(x,y)=I_R+I_S(x,y)+2\sqrt{I_R I_S(x,y)} \cos[ux+vy+\varphi(x,y)] \quad (1)$$

where $I_R$ and $I_S(x,y)$ are the reference and sample beam intensity distributions, respectively. u and v represent the frequency of spatial fringes along the x- and y-axes, and is the spatially varying phase associated with the sample under study. A no-fringe image is also acquired that represents the DC component in Eq. (1) by shifting the coherence gate out of the sample using a translation stage 25. By subtracting the no-fringe image from the original interferogram, generates only the interference term.

Figure 2A:
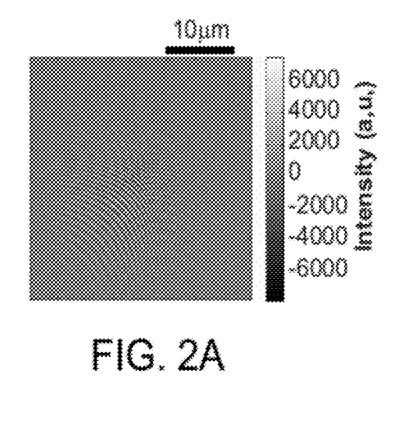
FIG. 2A shows a raw interferogram.

FIG. 2A shows an interference portion of the 2-D interferogram recorded by the full-field reflection phase microscope, using a 40 micron microsphere as a sample. The fringes, which are straight and equally-spaced for a flat sample, are changed by the modified wavefront of the sample beam reflected off the microsphere. In order to extract the profile of the sample under investigation, take the Hilbert transform of the interference portion of the 2-D interferogram, which yields both amplitude and phase of the returning sample beam. For more details on the use of a Hilbert transform for phase imaging, see U.S. application Ser. No. 11/389,670 filed Mar. 24, 2006, the entire contents of which is incorporated herein by reference. In the past, this approach has been used to retrieve sample amplitude and phase information in a transmission type quantitative phase microscope. For additional details on transmission phase microscopy, see U.S. application Ser. No. 12/218,029 filed Jul. 10, 2008, the entire contents of which is incorporated herein by reference.

Figure 2B:
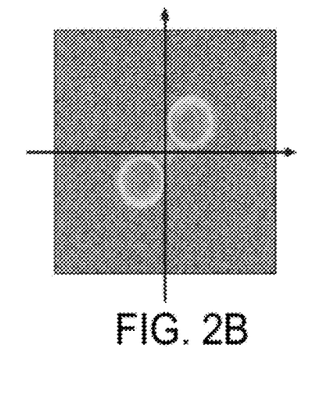
FIG. 2B shows amplitude component of the 2-dimensional Fourier transform of FIG. 2A.
Figure 2C:
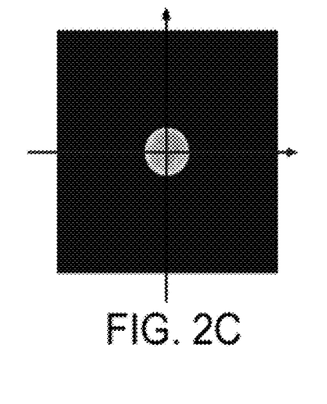
FIG. 2C shows a spatially filtered image of FIG. 2B.
Figure 2D:
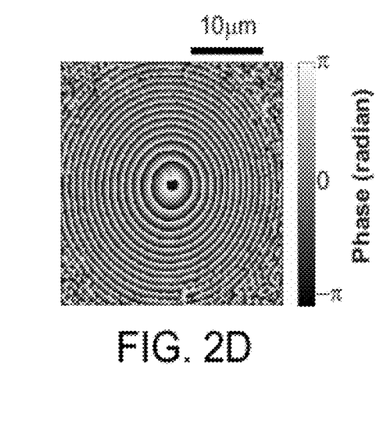
FIG. 2D is the phase component of the inverse Fourier transform of FIG. 2C.
Figure 2E:
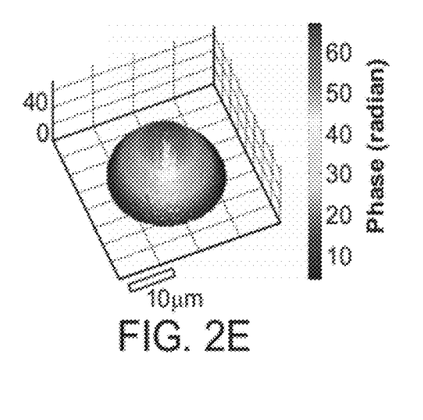
FIG. 2E is the unwrapped phase image derived from FIG. 2D.

FIG. 2B shows the amplitude of the 2-D Fourier transform of the interferogram in FIG. 2A. More specifically, the $1^{st}$ and $-1^{st}$ order components are shown in the first and third quadrants, respectively. First, crop or select the $1^{st}$ order component in the Fourier image, shift it to the center of the Fourier plane (see FIG. 2C), and then take the inverse Fourier transform. The phase of the inverse Fourier transformed image (FIG. 2D) provides the optical phase of the sample beam wavefront. By applying 2-D spatial phase unwrapping, the surface profile of the sample without $2\pi$ phase ambiguity is obtained as shown in the FIG. 2E.

Figure 3A:
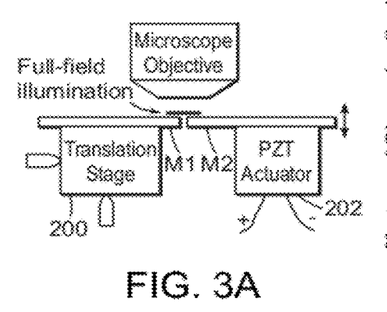
FIG. 3A illustrates a system configuration to determine the sensitivity of FF-RPM.

Intrinsic membrane fluctuations in living cells are typically on the order of a nanometer or less; the measurement of these small membrane fluctuations requires the development of quantitative phase microscopes with high signal-to-noise ratio (SNR). The measurement sensitivity of the full-field RPM can be illustrated in terms of the least detectable axial motion; the configuration to measure the measurement sensitivity is shown in FIG. 3A. The full-field illumination shines on both the surfaces; mirror or reflector M1 mounted on a translation stage 200 and mirror or reflector M2 attached to a Lead Zirconate Titanate (PZT) actuator 202.

In order to suppress the common mode noise due to independent mechanical or thermal fluctuations of the reference beam path with respect to the sample beam path, a self-phase referencing method can be utilized. Since the phase of all the points in the full-field illumination is acquired at the same time, every point in the field of view shares the same interferometric noise as any other point. This method uses the phase measured from a portion of the beam illuminating the reflector M1 as the reference phase, representing the common-mode noise. By subtracting this reference phase from the phase of the subsequent points on M2, the common-mode noise is removed to obtain actual fluctuation of the surface M2.

Figure 3B:
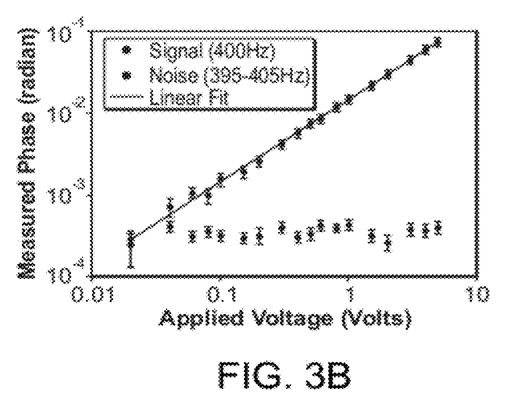
FIG. 3B shows a measured phase fluctuation (radian) as a function of applied voltage, where $M_i$: $i^{th}$ mirror, and PZT: Lead Zirconate Titanate.

To demonstrate common-mode phase noise rejection, the PZT actuator was driven at the frequency of 400 Hz whereas the amplitude of the PZT driving voltage was varied from 0.02-5 Volts. Single-shot phase images of the M1 and M2 were acquired simultaneously for duration of 1 second at 1 millisecond intervals. The temporal power spectral density (PSD) was calculated from the temporal fluctuation of the phase measured from M2, and the square-root of the PSD at 400 Hz was selected to determine the axial motion signal. FIG. 3B shows the measured axial motion at 400 Hz versus PZT driving voltage; the plot is well fit by the line 14.5 mrad/Volt. FIG. 3B also shows the noise floor estimated by taking the average of the square-root of the PSD from 395-405 Hz excluding the 400 Hz frequency. The maximum noise was only 0.44 (mrad/$\sqrt{HZ}$). This corresponds to 21(pm/$\sqrt{HZ}$), since the change in phase $\Delta\varphi$ is linearly related to the change in the axial position $\Delta l$ as $$\Delta l = \frac{\lambda}{4n\pi}\Delta\varphi, \quad (2)$$

where n is the refractive index of the medium (typically n=1.33).

Figure 4A:
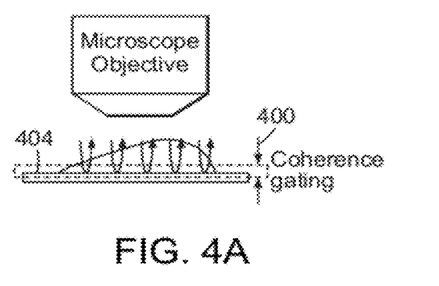
FIGS. 4A-4B show the location of a coherence gate for double-pass transmission and reflection phase imaging, respectively.
Figure 4B:
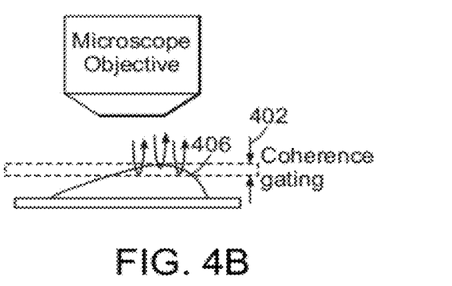
Figure 4C:
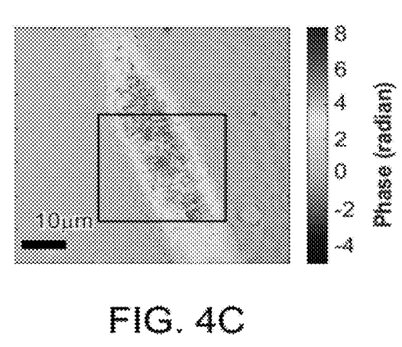
FIG. 4C shows a double-pass transmission phase image of a HeLa cell.

To demonstrate high-speed quantitative imaging of live cells, HeLa cells are sub-cultured on glass slides 2 days before the measurement and immersed in standard culture medium (Dulbecco's Modified Eagle Medium). As mentioned earlier, the setup is capable of taking transmission phase images as well as reflection phase images. FIGS. 4A and 4B show the location of the coherence gate 400, 402 for double-pass transmission phase imaging and the full-field reflection phase imaging, respectively. In double-pass transmission phase imaging, the illumination light passes through the cell, reflects off the glass surface reflector 404 and then passes through the cell again. The measured transmission phase difference $\Delta\phi_T$ is related to the optical thickness (OT) as $$OT(x, y) = \Delta\bar{n} \cdot h(x, y) = \frac{1}{2}\lambda\frac{\Delta\varphi_T(x, y)}{2\pi}, \quad (3)$$

where $\Delta\bar{n}$ is the mean of the refractive index difference between culture medium and cytoplasm and h is the height of the cell. FIG. 4C shows the corresponding transmission phase image of a live HeLa cell. The height of the cell was roughly estimated to be 8.5 µm by substituting $\Delta\bar{n}$=0.03 and $\Delta\varphi$=4 in Eq. (2).

Figure 4D:
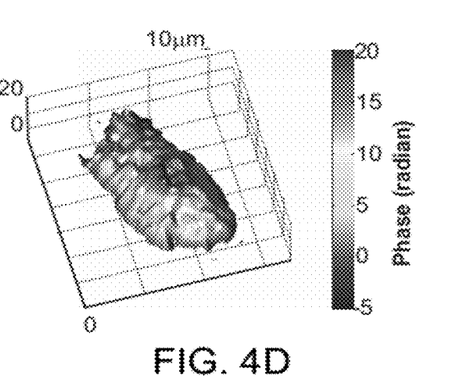
FIG. 4D shows a single-shot reflection phase image of the region inside square box in FIG. 4C.

For full-field reflection phase imaging, the focal plane as well as the coherence gate are placed on the cell surface 406 with gate 402. Since the backscattered light from out-of-coherence gate region does not contribute to the interference, the full-field phase information [see FIG. 4D] of cell surface within the coherence gate is collected as depicted in FIG. 4B. In this case, the reflection phase difference $\Delta\varphi_R$ is directly related to the height difference $\Delta h(x,y)$ . . . as $$\Delta h(x, y) = \frac{1}{2n_m}\lambda\frac{\Delta\varphi_R(x, y)}{2\pi}, \quad (4)$$

where $n_m$ is the refractive index of the culture medium and is typically 1.335.

The advantage of the reflection-mode imaging is clear when comparing Eqs. (3) and (4). For instance, 10 milliradian of the phase change in reflection phase image corresponds to 0.5 nanometers, whereas the same phase change in transmission corresponds to 20 nanometers. In other words, supposing that the phase sensitivity of the transmission and reflection-mode measurements is same, the height resolution (or measurement sensitivity) of the reflection phase imaging is 40 times $$\left(\frac{n_m}{\Delta n}\right)$$

better than that of transmission measurement. Moreover, the reflection phase image can reveal the shape of the cell surface independent of the distribution of intracellular refractive index since it depends only on the refractive index of the medium which can be accurately measured by a conventional refractometer.

As discussed above, membrane fluctuations are intrinsic indicator of overall cellular condition and are used to estimate membrane mechanical properties in relation to different stages of malaria infection in human red blood cells. But for eukaryotic cells having complex internal structures, the present full-field reflection phase microscope can selectively measure membrane fluctuations by effectively choosing to reject contributions from the internal cellular structures. The membrane fluctuations in HeLa cells can be measured under different cell conditions. More specifically, consider (i) a sample of living normal HeLa cells, (ii) a fixed HeLa cell sample after treatment with 2% paraformaldehyde and (iii) a sample of HeLa cells treated with 8 nM Cytochalasin-D which inhibits actin polymerization. The frame rate of the image acquisition was set to 1 kHz and the data was recorded for duration of 1 sec for each cell.

Figure 5A:
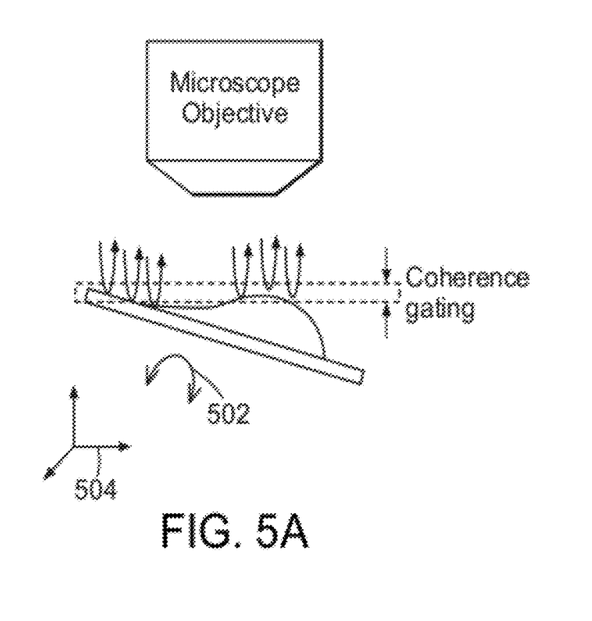
FIG. 5A shows the location of coherence gate in which the sample is tilted at an angle, allowing to simultaneously acquire membrane fluctuations as well as background phase from the coverslip; and where
Figure 5B:
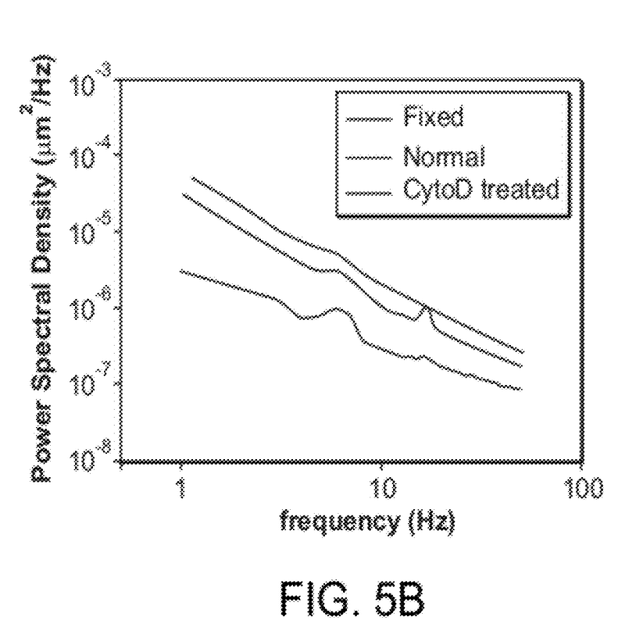
FIG. 5B shows the power spectral density of membrane fluctuations as a function of frequency for three different populations: blue, formalin fixed; green, normal; and red, CytoD-treated HeLa cells.

As shown in FIG. 5A, the sample under test was tilted or rotated through an angle 502 with the translation stage to simultaneously acquire membrane fluctuations as well as background phase from the coverslip. By subtracting the background phase change observed on the coverslip, the common-mode mechanical noise was eliminated. The temporal fluctuations on the cell surface were measured and calculated the PSD of membrane motion for each cell. The translation stage can also move the sample in any of three orthogonal directions 504. FIG. 5B shows the mean PSD for each cell population. The number of normal, fixed, and Cytochalasin-D treated cells used in this study were N=22, 20, and 33, respectively. The PSD of the fixed cells was measured and found to be smaller and flatter than the normal ones indicating that the cell membrane became stiffer after chemical fixation. On the other hand, the PSD of the Cytochalasin-D treated cells was measured larger than the normal ones indicating that the cell membrane became softer due to the inhibition of actin polymerization.

Figure 5C:
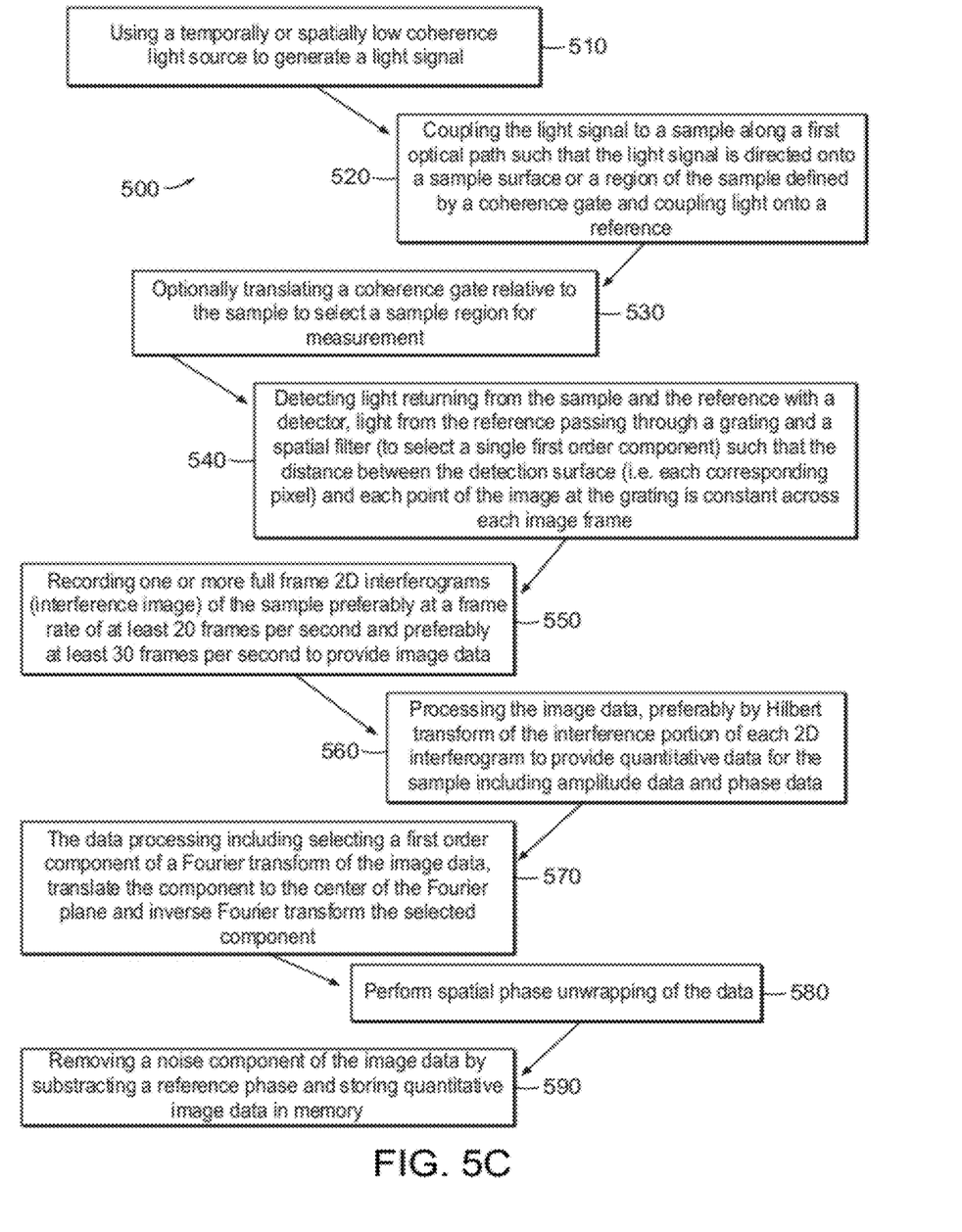
FIG. 5C illustrates a method of performing full frame reflection and/or transmission microscopy in accordance with preferred embodiments of the invention.

A process sequence 500 for measuring a sample in accordance with the invention is illustrated in FIG. 5C. The source, such as laser 14, generates a signal (single shot) 510 which is coupled 520 onto the sample and the reference 42. The stage 40 can position 530 the sample 24 relative to the coherence gate. The image is detected 540 and recorded 550 at a selected frame rate, preferably at least at 20 frames per second, or for faster dynamic processes at least at 30 frames per second or more. The image is processed 560 including the placement of image data in the Fourier plane 570. The image can be unwrapped 580, and noise components removed 590 for display and recording of quantitative data for the sample.

Figure 6A:
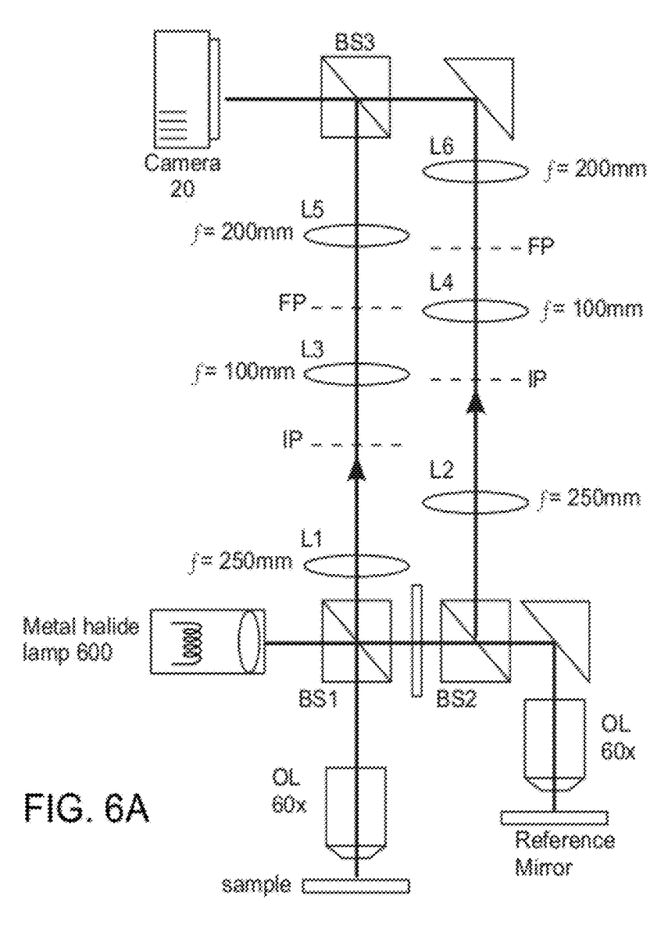
FIG. 6A shows a phase microscopy system using a spatially low-coherence light source such as a metal halide lamp, for example.
Figure 6B:
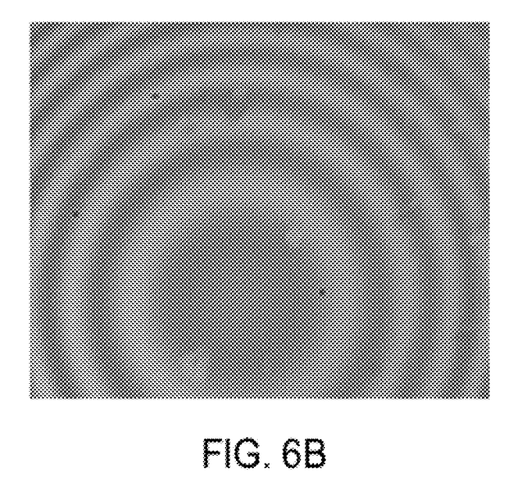
FIG. 6B shows the interferogram detected by the system of FIG. 6A.

A full-field reflection-phase-microscopy (FF-RPM) with spatially low-coherent light-source, and without a grating, is shown in FIG. 6A. A broadband source, such as a metal halide lamp 600, can be used. FIG. 6B shows an interference image obtained by the camera using the system of FIG. 6A with a circular pattern.

Figure 7A:
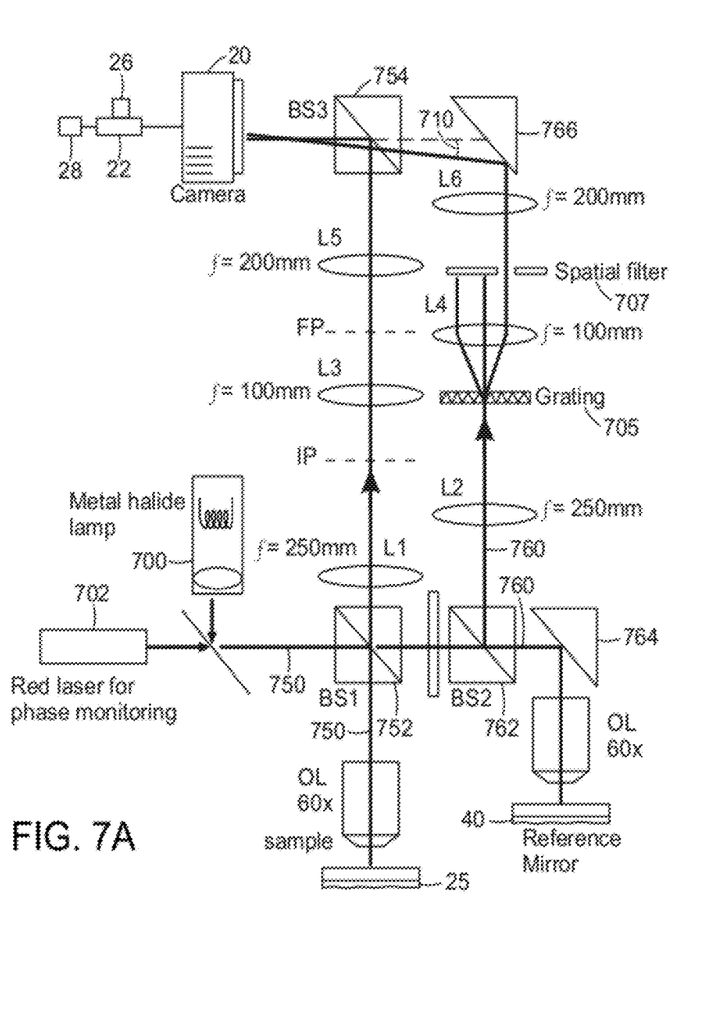
FIGS. 7A-7C show a reflection phase microscopy system with a metal halide lamp as a spatially low coherent light source using a grating and spatial filter in the reference light path, and images obtained therefrom, respectively.
Figure 7B:
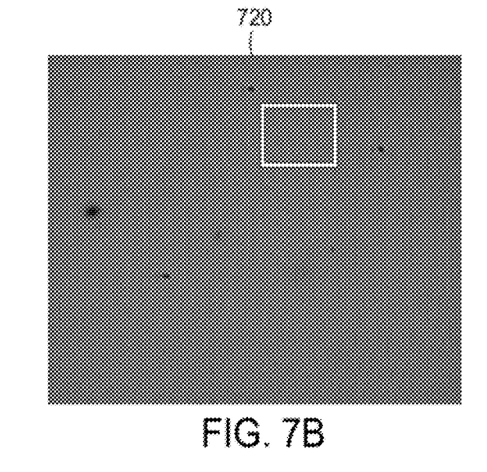
Figure 7C:
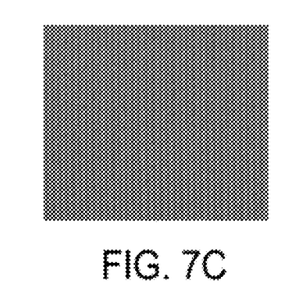

A preferred embodiment of the invention is shown in FIG. 7A with a FF-RPM with grating 705 and spatial filter 707. FIG. 7B shows an interference image obtained by the camera using the system of FIG. 7A and FIG. 7C shows an enlarged view of the indicated region of FIG. 7B where L1~L6 are Lenses, OL1 and OL2 are objective lenses, BS1~BS3 are beamsplitters IP: Image Plane, and FP: Fourier Plane. A broadband light source such as a metal halide lamp 700 provides the imaging light source, an X-Cite 120 (mfr. EXFO, Canada) with the center wavelength of 600 nm and the laser source 702 is a diode laser (Edmund optics) with an emission wavelength of 632 nm.

The light emitted from the spatially incoherent light source 700 (metal halide lamp) is split into two beams; the sample light 750 reflects off the sample and is directed through beamsplitters 752 and 754 to camera 20. The reference light 760 is directed using beamsplitters 762 and mirrors 764, 766 to the camera 20. The spatially and temporally incoherent light for imaging (e.g. the metal halide lamp) comprises the imaging light source. The light reflected by the sample is focused onto the imaging plane (IP) between the L1 and the L3. The image of the sample on the IP is focused onto the camera.

The light reflected by the reference mirror is focused onto the grating 705 between the L2 and the L4. The image of the grating is focused onto the camera but only the $1^{st}$ order of the diffracted beam is delivered.

If the grating is removed between L2 and L4 (See. FIG. 6A), the bulls-eye pattern of the interference fringe is obtained by the camera (See FIG. 6B). By inserting the grating 705 and the spatial filter 707 in FIG. 7A, the diffracted reference beam is incident on the camera with an angle 710 so that the interference image with multiple fringes is obtained by the camera 20 (See FIG. 7B). FIG. 7C is the enlarged view of the indicated region 720 of FIG. 7B.

The laser 702 (spatially and temporally coherent light source) shown in FIG. 7A is for monitoring the mechanical noise of the system. The function of the laser 702 is described in reference to FIGS. 8A-8C. The transform used (Hilbert Transform) to retrieve the phase information out of the interference image with multiple fringes can use the same process as described in connection with the spatially coherent light source.

Figure 8A:
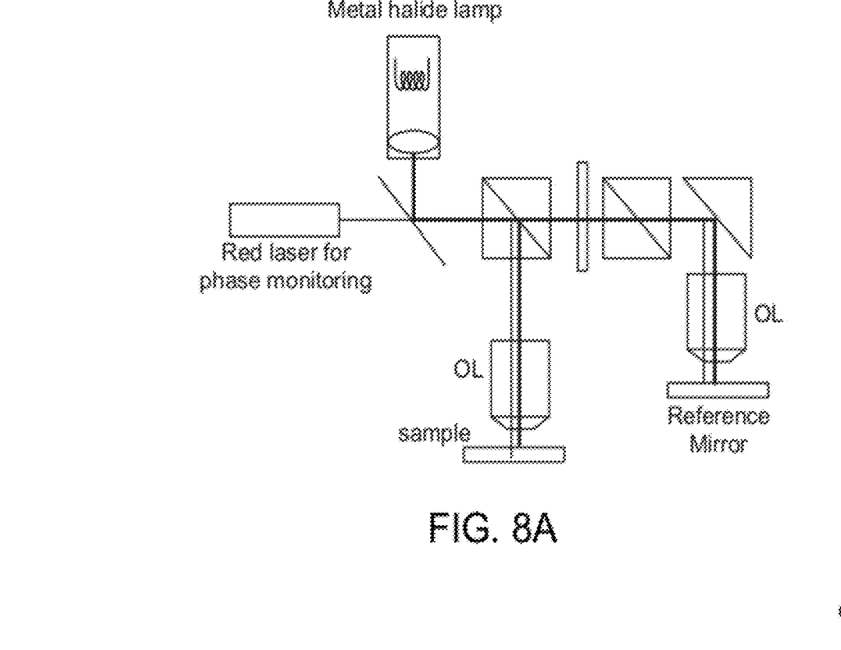
FIGS. 8A-8C show a noise substration method in accordance with preferred embodiments of the invention.
Figure 8B:
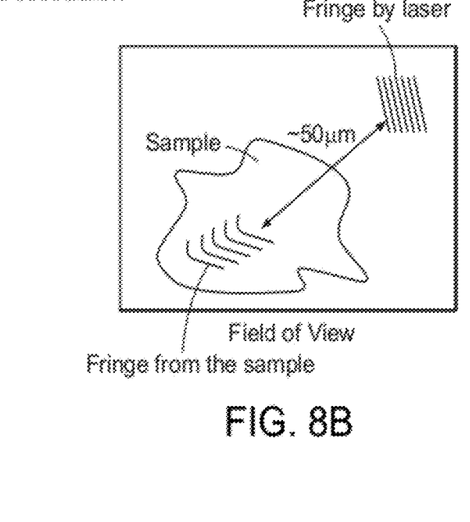
Figure 8C:
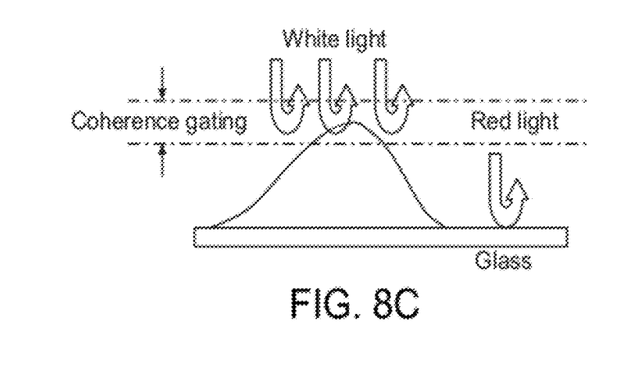

FIGS. 8A-8C illustrate a system for common-mode noise subtraction. FIG. 8A shows detail of the configuration of the imaging light and the laser light for monitoring the mechanical (common-mode) noise. FIG. 8B shows schematic illustration of the interference image. FIG. 8C shows side view of the sample configuration. Due to the mechanical instability of the system, the fringe of the interference image moves over time. To compensate for the mechanical noise, the laser light is used to monitor the mechanical noise.

The laser light shares the same optical path with the imaging light (see FIG. 8A). However, the beam is slightly shifted to the lateral direction by about 50 μm. The laser light hits the glass (substrate) surface while the imaging light is reflected from the surface of the sample; e.g. cells. Therefore, the detector can see both the interference fringes from the sample surface and the interference fringes from the glass substrate in the same image (see FIG. 8B). FIG. 8C shows the side view of the sample. By the coherence gating of the low-coherent imaging light source, only the reflected imaging light from a limited depth makes the interference fringe, while the laser light reflected from the glass substrate makes the interference fringe regardless of the optical path difference.

Figure 9A:
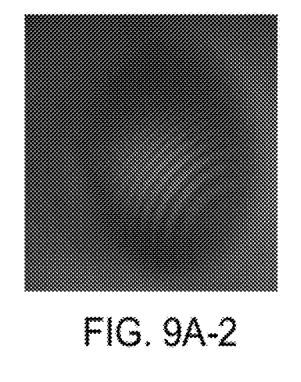
FIGS. 9A-9C illustrate phase images of a bead surface using a spatially low-coherence light source.
Figures 9A, 9A:
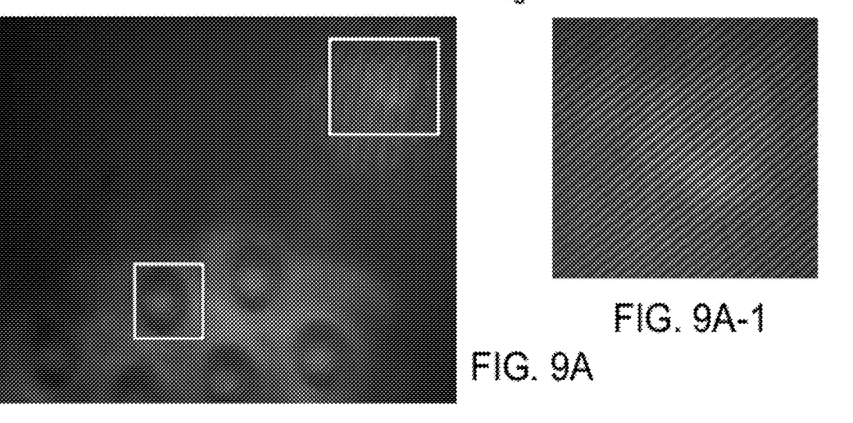
Figure 9B:
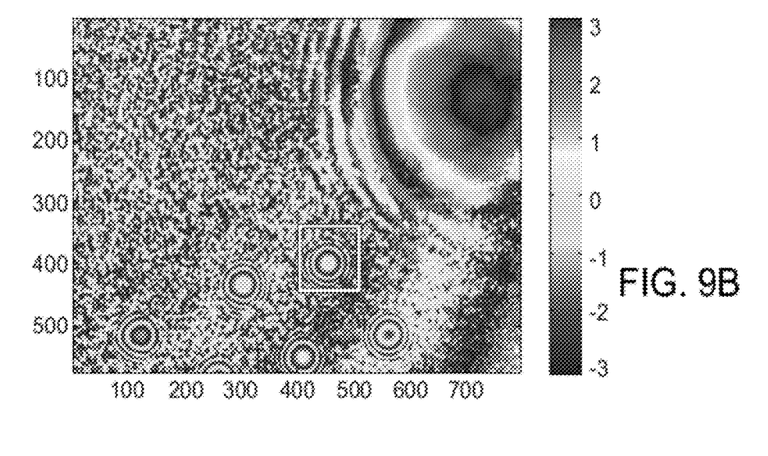
Figure 9C:
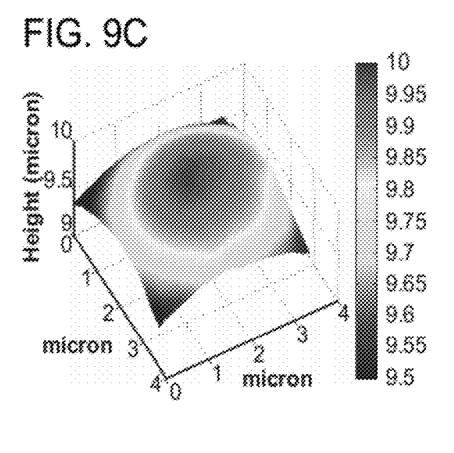

FIGS. 9A-9C illustrate a phase image of 10 µm polystyrene beads. FIG. 9A shows a one-shot interference image where FIG. 9. (a-1) and FIG. 9 (a-2) is the zoom-in of the region indicated by rectangles. FIG. 9B shows a phase image where the pseudo-color shows the phase in radian. FIG. 9C shows the surface profile of the bead.

FIG. 9A shows the one-shot interference image. The coherence gating is adjusted to the surface of the beads. The interference fringes by the reflection of the imaging light from the bead surface are obtained (see. FIG. 9 (a-2)) as well as the interference fringes by the reflection of the laser light from the glass substrate (see. FIG. 9 (a-1)). By the Hilbert Transform, the full-field phase image is obtained as shown in the FIG. 9B. The image of a bead can be cropped and processed to provide a two-dimensional phase unwrapping and thereby retrieve the surface profile of the bead.

Figure 10A:
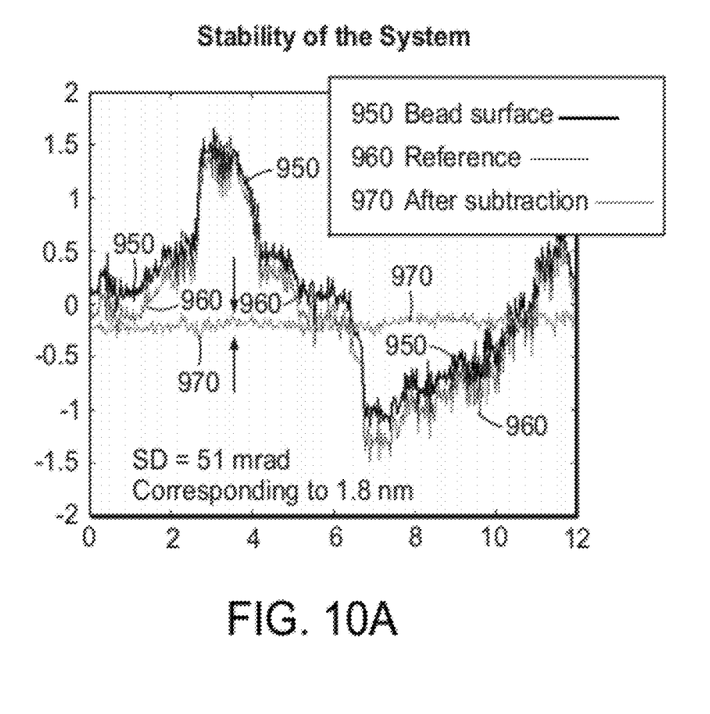
FIGS. 10A and 10B illustrate the measurement of system stability.

The result of the common-mode noise subtraction is illustrated with FIG. 10A, where the phase fluctuation observed on the bead surface 950, at the glass substrate 960 by the laser, and the true phase fluctuation of the bead surface observed by the system after subtration 970 are shown.

Figure 10B:
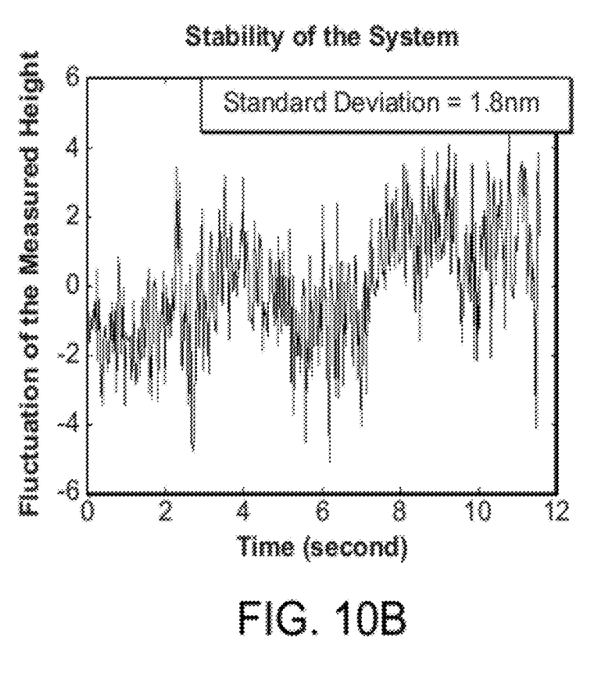

FIG. 10B shows a zoom-in of the true phase fluctuation of the bead. This is the same plot of the line 970 in FIG. 10A with a detailed scale.

These show the result of the common-mode noise subtraction. In this example, the interference images were recorded within 12 seconds in 33 millisecond intervals (30 Hz) to obtain the time-series data of the phase image. The raw data of the phase fluctuated over 3 radians on both the bead surface and the glass surface. However, the trend of the fluctuation of the bead surface and the glass surface is similar because the source of this fluctuation is the overall fluctuation of the path length of the sample arm and the reference arm. By subtracting the fluctuation of the glass from the fluctuation of the bead, a very stable time-series of the phase on the bead was obtained. The remaining instability was 52 milliradians (standard deviation) which corresponds to 1.8 nanometer of the height resolution. Note that when the surface motion of the glass is subtracted from the one of the bead, the ratio of the wavelength between the imaging light and the laser light is taken into consideration. The ratio was 1.05 and the phase fluctuation of the glass multiplied by the factor of 1.05 was subtracted from the phase fluctuation of the beads.

Hence, a preferred embodiment of the present invention has implemented a FF-RPM with a spatially incoherent light source so that the surface shape of the sample is obtained in nanometer z-resolution. The advantage of the system with a spatially incoherent light source to the one with a spatially coherent light source is that the image is free of speckle noise.

While the invention has been described in connection with specific methods and apparatus, it is to be understood that the description is by way of example of equivalent devices and methods not as a limitation to the scope of the invention as set forth in the claims.

What is claimed is:

1. A system for off axis reflection phase imaging of a material comprising:
    a light source;
    a material to be imaged that is positioned to receive illuminating light from the light source;
    an optical system that optically couples illuminating light from the light source through a first lens onto the material, the optical system coupling reference light from the light source along a reference optical path wherein the reference optical path has a diffraction element that diffracts reflected light from a reflector such that a selected diffraction order of reference light from the light source is coupled to an imaging lens;
    an imaging detector that detects reflected light through the first lens from the material in response to the illuminating light and wherein the imaging detector detects the diffracted order of reflected reference light from the imaging lens that interferes with the light reflected from the material, the reflected reference light being tilted at an angle relative to the light reflected from the material that is incident on the imaging detector and such that an optical path length measured from a plurality of different points on the diffraction element to a corresponding pixel of the imaging detector is constant;
    a moveable translation stage to selectively position a coherence gate relative to the material such that the reflected light from a portion of the material within the coherence gate is detected by the imaging detector; and
    a data processor that processes full frame off-axis reflection phase interferograms detected by the imaging detector to generate a phase image of the portion of the material within the coherence gate.

2. The system of claim 1 wherein light from the light source is transmitted through the material and reflected by a reflector mounted on a second translation stage, the reflected light from the reflector being further transmitted through the material and detected by the imaging detector.

3. The system of claim 1 wherein light from the light source is reflected off a surface of the material.

4. The system of claim 1 wherein the translation stage positions the coherence gate within a portion of the material with the lens.

5. The system of claim 1 wherein the low coherence light source comprises a laser that emits a single shot of light to generate the phase image.

6. The system of claim 1 wherein the light source comprises a broadband light source.

7. The system of claim 1 further comprising a reference light path that is incident on a surface of the imaging detector at an angle relative to light incident on the surface from the material to provide off axis interference.

8. The system of claim 1 wherein the optical system comprises a spatial filter that transmits a single order of light received from a grating.

9. The system of claim 1 wherein the diffraction element comprises a grating.

10. The system of claim 7 wherein the reference light path separates a diffraction order of the reflected light with a grating.

11. The system of claim 1 further comprising a spatial filter that receives light from the diffraction element and transmits the diffracted order of reflected light.

12. The system of claim 1 wherein the data processor that is connected to the imaging detector is configured to process image data to generate a full field phase image of the material.

13. The system of claim 12 further comprising a display that displays a full field quantitative phase image of the material.

14. The system of claim 12 further comprising a memory for storing image data.

15. The system of claim 1 further comprising an actuator providing relative movement between the light source and the material to be imaged.

16. The system of claim 1 wherein the translation stage moves the material to position the coherence gate.

17. The system of claim 16 wherein the translation stage orients the material at an oblique angle relative to an incident light axis.

18. The system of claim 1 wherein light is reflected by the material, the reflected light being incident on the imaging detector at a different angle than the diffracted order of light.

19. The system of claim 7 wherein the reference light path includes a reflector.

20. The system of claim 1 wherein the material is positioned on a reflective surface.

21. The system of claim 1 wherein a beamsplitter separates light onto a reference path and an imaging path that includes the material to be imaged.

22. The system of claim 1 further comprising a coherence gate positioned relative to the material.

23. The system of claim 22 wherein the coherence gate is positioned to provide a transmission image of the material.

24. The system of claim 22 wherein the coherence gate is positioned to provide a reflection image of the material.

25. A method for off axis reflection phase microscopy comprising:
    delivering light from a low coherence light source through a first lens onto a portion of a material to be measured that is positioned within a coherence gate along a first light path optically coupled to the light source, the material being positioned over a reflecting surface that is mounted on a moveable translation stage;
    delivering light through a second lens onto a reflecting reference that is optically coupled to the light source;
    separating a diffraction order of light received through the second lens from the reflecting reference; and
    detecting light with an imaging detector, the detected light including reflected light from within the coherence gate positioned on the portion of the material wherein the reflected light from the material is directed through the first lens and along a first axis and the separated diffraction order of light directed along a second axis that is tilted at a different angle relative to the first axis to form an interference pattern at the imaging detector that generates a full field off-axis quantitative phase image of the material in the coherence gate.

26. The system of claim 25 further comprising transmitting light from the light source through the material onto a reflector which reflects light that is further transmitted through the material to provide reflected light detected by the imaging detector.

27. The method of claim 25 further comprising reflecting light from the light source off a surface of the material.

28. The method of claim 25 further comprising using a translation stage to position the coherence gate within the portion of the material and wherein a further portion of the material outside the coherence gate is not imaged.

29. The method of claim 25 wherein the low coherence light source comprises a laser.

30. The method of claim 25 wherein the light source comprises a broadband light source.

31. The method of claim 25 wherein the reference light path is incident on a surface of the imaging detector at an angle relative to light incident on the surface from the sample.

32. The method of claim 25 further comprising using a spatial filter to transmit a single order of light received from the grating.

33. The method of claim 25 further comprising processing image data with a data processor that receives image data from the imaging detector.

34. The method of claim 25 further comprising displaying image data on a display.

35. The method of claim 25 further comprising storing image data in a memory.

36. The method of claim 25 further comprising Hilbert transforming image data to provide a phase image.

37. The method of claim 25 further comprising orienting the material at an angle relative to an incident light axis.

38. The method of claim 25 further comprising imaging a biological sample.

39. The method of claim 25 further comprising imaging a moving cellular structure.

40. A system for off-axis reflection phase microscopy comprising:
    a low coherence light source;
    a sample to be measured that is positioned over a reflective surface and along a first light path optically coupled to the light source such that light is delivered onto the sample through a lens, the reflective surface being mounted on a translation stage;
    a reference reflector positioned on a reference light path, the reference reflector being optically coupled to the light source at a fixed distance;
    an optical system that selects a diffraction order of light reflected by the reference reflector; and
    an imaging detector that detects reflected light passing through the lens from the sample and the selected diffraction order of light from the reference reflector, the light from the sample being incident on the imaging detector and also being tilted at a different angle than the light received from the reference reflector at the imaging detector such that full frame off-axis reflection phase interferograms are generated.

41. The system of claim 40 wherein light from the light source is transmitted through the sample and reflected by a first light path reflector such that reflected light is further transmitted through the material and detected by the imaging detector.

42. The system of claim 40 wherein light from the light source is reflected off a surface of the sample.

43. The system of claim 40 wherein the translation stage is configured to position a coherence gate relative to the sample.

44. The system of claim 40 wherein the low coherence light source comprises a laser.

45. The system of claim 40 wherein the light source comprises a broadband light source.

46. The system of claim 40 wherein the reference light path is incident on a surface of the imaging detector at an angle relative to light incident on the surface from the sample.

47. The system of claim 40 wherein the optical system comprises a grating and a spatial filter.

48. The system of claim 47 wherein the spatial filter transmits a single diffraction order of light received from the grating.

49. The system of claim 40 wherein the system performs off axis interferometry.

50. The system of claim 40 wherein the optical system uses the first diffraction order of light to interfere with light reflected by the sample.

51. The system of claim 40 wherein the reflective surface can tilt at an angle relative to incident light.

52. The system of claim 40 wherein light from the light source is transmitted through the sample, reflects from a sample support surface and through the sample for imaging.

53. The system of claim 40 wherein the coherence gate is positioned out of the sample to obtain a no-fringe image.

54. The system of claim 40 wherein the optical system selects a first diffraction order component from a Fourier image and that shifts the component in a Fourier plane.

55. The system of claim 54 wherein the system obtains an inverse Fourier transform of an image.

56. The system of claim 40 further comprising a data processor that phase unwraps the image.

57. The system of claim 40 wherein the image comprises a full field quantitative phase image.

58. The system of claim 40 further comprising a first mirror mounted on a translation stage wherein the sample is mounted over the first mirror and wherein a second mirror is coupled to an actuator such that noise can be removed from an image.

59. The system of claim 58 wherein common-mode phase noise is subtracted from the image.

60. The system of claim 40 wherein the system determines a power spectral density of the sample.

* * * * *

UNITED STATES PATENT AND TRADEMARK OFFICE
CERTIFICATE OF CORRECTION

PATENT NO. : 10,451,402 B2
APPLICATION NO. : 13/358254
DATED : October 22, 2019
INVENTOR(S) : Yaqoob et al.

Page 1 of 1

It is certified that error appears in the above-identified patent and that said Letters Patent is hereby corrected as shown below:

In the Specification

In Column 1, Lines 11-14, delete:
"This work was funded by the National Center for Research Resources of the National Institutes of Health (P41-RR02594-18), the National Science Foundation (DBI0754339)."
And insert:
-- This invention was made with government support under DBI0754339 awarded by the National Science Foundation, and P41 RR002594 awarded by the National Institutes of Health. The government has certain rights in the invention. --

Signed and Sealed this
Sixteenth Day of December, 2025

John A. Squires
*Director of the United States Patent and Trademark Office*